July 14, 1964

G. B. STONE 3,140,621

PULLEY HUB WITH CROWNED OUTER FACE

Filed April 2, 1962

Guthrie B. Stone
INVENTOR.

BY *Clarence A. O'Brien*
*and Harvey B. Jacobson*
Attorneys

United States Patent Office 3,140,621
Patented July 14, 1964

3,140,621
PULLEY HUB WITH CROWNED OUTER FACE
Guthrie B. Stone, Stone Conveyor Co. Inc., Honeoye, N.Y.
Filed Apr. 2, 1962, Ser. No. 184,265
7 Claims. (Cl. 74—230.3)

The present invention generally relates to novel and improved pulley constructions and more particularly to a pulley for use with conveyor belts and the like.

The primary object of the present invention is to provide individual pulley hubs or ends having a crown effect in the outer face thereof thereby eliminating the necessity for crowning the center portion of the pulley.

Another object of the present invention is to provide a pulley hub or end constructed of steel stampings, plastic material or the like which may be associated with a desired length of common pipe or tubing of cylindrical configuration thus enabling any desired length of pulley to be made up for the individual installation desired thereby enabling the cost of such a pulley to be materially reduced with the crown surface incorporated into the hubs or ends being sufficient to retain the conveyor belt in alignment. While the pulley construction is primarily for use in conjunction with conveyor belts, it is also readily obvious that it will be advantageous in various uses when combined with belting of any type.

Normally, a pulley of this type is constructed with a slight crown effect in the outer surface thereof which requires machining for accuracy. Such machining is time-consuming and greatly increases the cost of the pulley. Further, if a pulley of a particular length is required, it is necessary that the manufacturer supply the desired length of pulley. In distinction to this, the present invention incorporates the use of two individual hubs or ends having a crown effect in the outer surface thereof and a recess on the inner edge adapted to receive the end edges of a cylindrical section of common pipe whereby the pipe may be cut to any desired length for forming a pulley of any desired length with the hubs or ends being held together by through bolts thereby enabling the user of the pulley of the present invention to make-up any length pulley desired without any machining operation whatsoever. The pulley end may be easily chucked for boring the hub opening to a desired size. By having a plurality of sets of ends to fit various pipe sizes which are standard steel pipe size, substantially any size and length of pulley may be made-up without requiring the expenditure of a considerable investment for stocking a plurality of pulleys of different diameters and different lengths having a crown machined into the outer surface thereof. It has been found that where the end portions of a pulley such as in this invention have a crowned effect in the outer face thereof, the regular 1 or 2 degree crown machined into a conventional one piece belt pulley is unnecessary since the 1 or 2 degree crown in the end hub or end portion of the pulley suffices for proper belt tracking and alignment.

Another important object of the present invention is to provide a novel method of forming a belt pulley of the type having a crown effect incorporated into the pulley hubs or ends for proper belt tracking and alignment.

Still another feature of the present invention resides in its simplicity of construction, ease of assembly, adaptation for various installations, its use of standard components and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
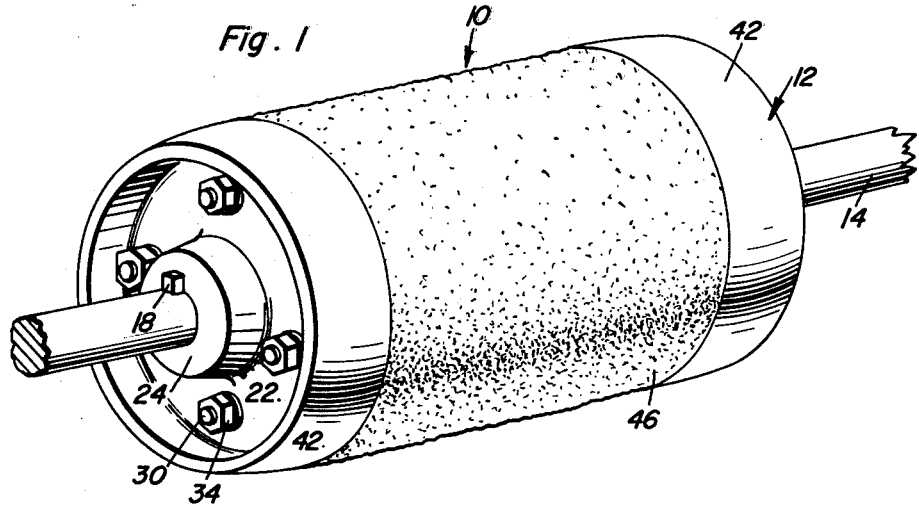
FIGURE 1 is a perspective view of a pulley constructed in accordance with the present invention.

Referring now specifically to the drawings, the numeral 10 generally designates a pulley incorporating the individual hubs or ends 12 of the present invention therein. The pulley 10 is mounted on a suitable shaft 14 of any desired size and may be keyed thereto by use of a conventional key 16 being partially received within a groove 18 in the shaft and partially received in a recess in the hub of the pulley in a conventional manner.

The pulley hubs or ends 12 are substantially identical in construction and may be made identical for ease of manufacture by using a key notch 20 in each hub 12 if desired.

Each hub 12 includes a circular plate 22 having a central enlargement 24 provided with a bore 26 extending therethrough which receives the shaft 14. A portion of the bore 26 has the notch or slot 20 formed therein for locking the pulley 10 to the shaft 14 for rotation therewith. The intermediate portion of the plate 22 is provided with a plurality of apertures 28 for receiving through bolts 30 which have threaded end portions 32 thereon receiving retaining nuts 34 of conventional construction. Thus, the through bolts 30 extend through the opposed pulley hubs 12 for retaining them in assembled relation.

Figure 2:
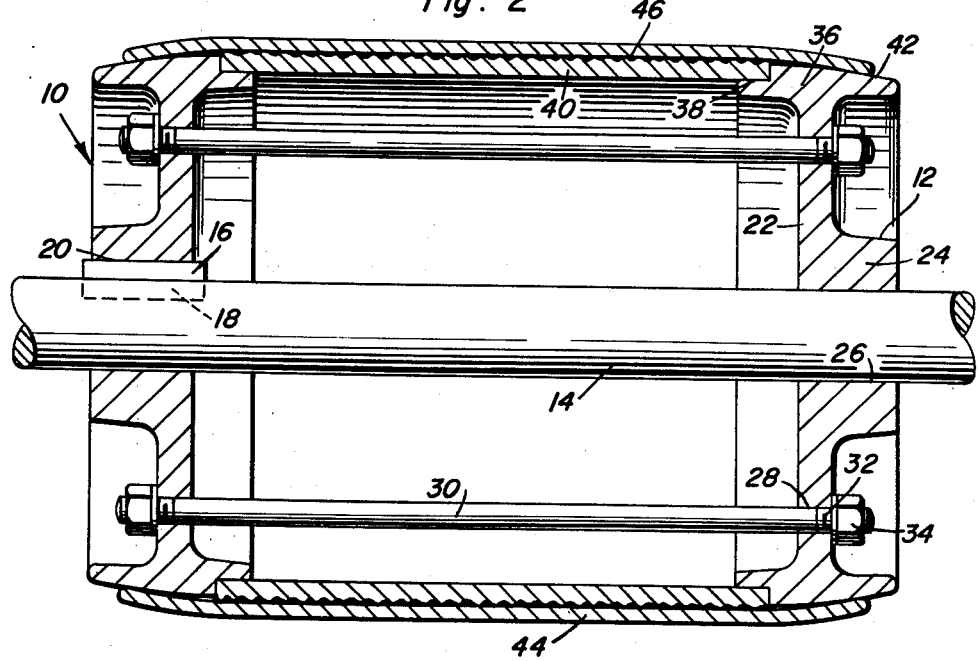
FIGURE 2 is a longitudinal, sectional view taken substantially upon a longitudinal centerline of the pulley.

At the outer edge of the circular plate 22, there is provided a transverse enlargement 36 forming an outer face which extends laterally from each side of the plate 22. The inner edge of the outer face 36, that is, the portion which faces inwardly of the pulley is provided with a recess 38 communicating with the outer surface of the outer face. The recess 38 receives the end portion of a cylindrical pipe section 40 which may be of any desired length. The recess 38 is made to receive the inside diameter of a standard size steel pipe 40 whereby the steel pipe 40 may be securely clamped between the pulley hubs 12 by tightening the through bolts 30. The over-all length of the pulley 10 may be varied by varying the length of the pipe section 40 and correspondingly varying the length of the through bolts 30 thereby enabling the pulley hubs 12 to be used with substantially any length of pipe section 40 for purposes of forming a pulley of a desired length. The pipe section 40 is a standard size pipe as to inside and outside diameter and the ends thereof are true, that is, perpendicular to the longitudinal axis of the pipe section. As illustrated in FIGURE 2, the outer surface of the pipe section 40 is substantially flush with the outer surface of the outer face 36. The outer surface of the outer face 36 is provided with a crown effect and is designated by numeral 42. The outer surface 42 is curved inwardly gradually from the surface of the inner portion of the outer surface 42 which is flush with the pipe section 40 thereby providing a crowned effect for the pulley hubs 12.

When a belt such as a conveyor belt 44 is placed on the pulley 10, the crowned effect of the outer surface 42 of the pulley hubs 12 will cause the belt 44 to track properly and to maintain itself aligned properly and orientated properly on the pulley 10 substantially in the same manner as a conventional crowned pulley and it has been found that the crowned effect on the pulley hubs 12 is sufficient to maintain the belt 44 in proper tracking and alignment relationships.

If desired, a lagging 46 may be provided on the pipe section 40 with such lagging taking any desired configuration. Such lagging may be in the form of an expanded or rigidized metal member welded or otherwise secured to the exterior surface of the pipe section 40 or conventional rubber lagging may be used. With the present invention, a person may more easily make-up their own pulleys of the self-tracking or alignment type of any desired length and diameter by having on hand only several sets of pulley hubs 12 adapted to fit standard pipes of different standard sizes or standard tubular members. The lagging 46, regardless of the type used, is more easily applied to the flat surface of the cylindrical member, pipe section or tubular member than to a pully having a center crown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pulley construction comprising a pair of end hubs adapted to be connected with a shaft, means interconnecting the hubs, and a cylindrical member of standard size disposed between the hubs thereby forming a cylindrical intermediate portion for the pulley, each hub having a crown effect formed in the outer surface thereof for retaining a belt in proper tracking relation on the pulley, the external surface of the cylindrical member forming a continuation of the inner end of the outer surface of the hubs.

2. The structure as defined in claim 1, wherein each of said hubs includes a peripheral recess in the inner end edge thereof receiving the end edge of the cylindrical member, said member being of standard inside and outside diameter whereby members of various lengths may be interposed between the hubs thereby enabling one set of hubs to be employed with various lengths of cylindrical members for forming pulleys of various lengths.

3. The structure as defined in claim 2, wherein said means interconnecting the hubs includes through bolts extending through the hubs at a plurality of circumferentially spaced points, said through bolts being of lengths commensurate with the length of a pipe section for securely retaining the hubs and pipe section in assembled relation.

4. A pulley assembly comprising a pipe section of standard inside and outside diameter and of desired length, a pair of end hubs, each end hub having a rim portion provided with a crown effect in the outer surface thereof, the inner end edge of each rim portion having an annular recess telescopically receiving the end of the pipe section with the bottoms of the recesses abutting the ends of the pipe section, and through bolts releasably urging the hubs towards the pipe section for rigidly retaining the pipe section clamped between the hubs, the crown effect in the outer surface of the rim portion curving inwardly longitudinally from the inner end towards the outer end thereof.

5. A pulley assembly comprising a section of hollow pipe having standard inside and outside diameter and of selected length, the external surface of said pipe being cylindrical, a pair of end hubs, each hub having a plate with a central hub portion for connection with a shaft, the outer peripheral edge of each end hub having a belt engaging surface substantially coextensive with the external surface of the pipe and in abutting engagement with the end edge of the pipe, said belt engaging surface tapering slightly inwardly in a smooth curve from the point of abutting engagement with the end of the pipe to the opposite edge thereof thereby providing a crown effect in the end hubs only for retaining a belt on the pulley, the edge of the hub in abutting engagement with the pipe having an axial extension of reduced diameter thereby forming an annular recess in the hub for telescopically receiving the end of the pipe, and means interconnecting the end hubs directly for urging the end hubs toward each other thereby rigidly clampingly engaging the pipe between the end hubs for forming a rigid pulley assembly.

6. The structure as defined in claim 5 wherein said means directly interconnecting the end hubs includes a plurality of bolts of a selective length commensurate with the length of the section of pipe thereby enabling the effective length of the pulley to be varied by selecting the length of standard diameter pipe and through bolts of commensurate length without requiring any machining or other modification of the standard pipe.

7. The structure as defined in claim 6 wherein each end hub is provided with a centrally disposed opening for mounting on a shaft, an axially enlarged hub portion defining the central opening for forming a rigid end hub, and lagging on the external surface of the pulley for reducing slippage between the pulley and a belt received thereon.

References Cited in the file of this patent
UNITED STATES PATENTS

| | | |
|---|---|---|
| 924,402 | Turner | June 8, 1902 |
| 1,521,823 | Martins | Jan. 6, 1925 |
| 2,286,152 | Miller | June 9, 1942 |
| 2,692,773 | Lorig | Oct. 26, 1954 |
| 2,736,205 | Dunne | Feb. 28, 1956 |
| 2,966,065 | Renner | Dec. 27, 1960 |